United States Patent [19]
Lebas et al.

[11] Patent Number: 6,146,279
[45] Date of Patent: *Nov. 14, 2000

[54] TORQUE DAMPING DEVICE, IN PARTICULAR CLUTCH FRICTION, PARTICULARLY FOR MOTOR VEHICLES

[75] Inventors: Gilles Lebas, Asnieres; Fabrice Tauvron, Athis-Mons, both of France

[73] Assignee: Valeo, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 09/155,362
[22] PCT Filed: Jan. 28, 1998
[86] PCT No.: PCT/FR98/00153
  § 371 Date: Sep. 28, 1998
  § 102(e) Date: Sep. 28, 1998
[87] PCT Pub. No.: WO98/32991
  PCT Pub. Date: Jul. 30, 1998

[30] Foreign Application Priority Data

Jan. 28, 1997 [FR] France ................... 97 00875

[51] Int. Cl.[7] .......................... F16F 15/123; F16F 15/129
[52] U.S. Cl. .............................................. 464/68; 192/214
[58] Field of Search ................................... 192/212, 214, 192/55.61, 70.17; 464/68

[56] References Cited

U.S. PATENT DOCUMENTS

| | | | |
|---|---|---|---|
| 4,398,625 | 8/1983 | Beccaris | 464/68 X |
| 4,548,309 | 10/1985 | Braun | 192/70.17 X |
| 4,848,551 | 7/1989 | Caspar | 464/68 X |
| 5,836,820 | 11/1998 | Reik et al. | 464/68 |

*Primary Examiner*—Rodney H. Bonck
*Attorney, Agent, or Firm*—Liniak, Berenato, Longacre & White

[57] ABSTRACT

A torque damping device including a support disc, a second guide washer provided with pressed sections and an intermediate hub disc. The support disc has elastic clamps acting on the hub disc for pushing the pressed sections towards the hub disc. The invention is particularly applicable to clutch friction for motor vehicles.

16 Claims, 4 Drawing Sheets

TORQUE DAMPING DEVICE, IN PARTICULAR CLUTCH FRICTION, PARTICULARLY FOR MOTOR VEHICLES

BACKGROUND OF THE INVENTION

Field of the Invention

This invention relates to torsion damping devices of the kind comprising at least two coaxial parts mounted for rotation of one with respect to the other within the limits of a predetermined angular displacement and against the action of circumferentially acting resilient members, one of the said coaxial parts comprising a hub plate while the other comprises a support plate fixed to two guide rings which flank and are spaced away from the hub plate, and each of the resilient members being mounted partly in seatings formed in the hub plate and partly in corresponding seatings formed in the guide rings.

DESCRIPTION OF THE RELATED ART

This is for example a clutch friction wheel for a motor vehicle.

In such a case the friction disc, comprising a radial support plate which carries friction liners at its periphery, is fixed through its support plate to one of the guide rings.

In practice, axially acting friction means are provided.

These means conventionally comprise an axially acting resilient ring, which bears on one guide ring and on an application ring which is coupled in rotation to the same guide ring so as to grip a friction ring between the hub plate and the other guide ring.

A large number of components is therefore provided.

An object of the present invention is to reduce the number of components in a simple and inexpensive way.

SUMMARY OF THE INVENTION

According to the invention, a torsion damping device of the type described above is chlaracterised in that one of the guide rings, referred to as the second guide ring, includes press-formed elements which may be joined together continuously and which are directed towards the hub plate, and in that the support plate is firstly arranged on the other side of the hub plate with respect to the second guide ring, and secondly has, in facing relationship with the press-formed elements, lugs which are elastically deformable in the axial direction and which act on the hub plate so as to urge the press-formed elements towards the hub plate.

Thanks to the invention the number of components is reduced, because the axially acting resilient ring of the prior art is replaced by the support plate, while the second guide ring is more rigid.

In one embodiment, a ring having a predetermined coefficient of friction may be interposed axially between the hub plate and the support plate, and/or between the hub plate and the press-formed elements of the second guide ring, so as to avoid metal-to-metal frictional contact.

This ring may be fixed to one of the elements consisting of the hub plate or press-formed elements or support plate, or it may be mounted free.

It may be replaced by a coating deposited on one of the elements consisting of the hub plate, the support plate or the press-formed elements.

In one embodiment, the support plate and/or the press-formed elements bear directly on the hub plate so as to reduce the number of components even more.

The axially resiliently deformable lugs are preferably formed by stamping and bending.

By a suitable choice of the form of the cut-outs and of the bending configuration, it is possible to obtain a stiffness which enables manufacturing tolerances to be taken care of.

The support plate may carry the friction liners, or it may be connected directly to a driving flywheel fixed in rotation to a first shaft such as a driving shaft, while the hub is coupled in rotation to a second shaft such as a driven shaft.

In the first case, the friction liners are arranged to be coupled releasably to the drive shaft. The seatings in the guide rings may be of any appropriate form, and consist of windows.

The support plate may be fixed to a third guide ring or it may constitute by itself a first guide ring, with, for each of the windows in the guide rings and for satisfactory retention of the resilient members, at least two flanges, commonly called eyelids, which project from the side opposite to the hub plate, namely an upper flange which extends along the circumferential edge which is radially the outermost one of such a window, and a lower edge which extends along its radially innermost circumferential edge.

At their circumferential edges the resilient members typically bear on the edge of the said guide rings.

In order that the latter will be able to resist the resulting specific pressure in a suitable way, it is usual to give them a substantial thickness, which is in general at least equal to 1.5 mm, and consequently to apply suitable treatment to them.

Costs are reduced when one of these guide rings is omitted and when the support plate functions of the friction disc are incorporated.

However, in order to be able to perform its proper functions which call for a certain amount of elasticity, this support plate is substantially thinner than a guide ring, its thickness being in general less than 1 mm.

It is therefore not normally for consideration that the resilient members be able to bear on the edge of the support plate.

In order to overcome this difficulty it has been proposed to provide additional flanges, which are referred to here as lateral flanges, along the radial edges of the windows of a said support plate at the circumferential ends of the windows, so that the engagement of the resilient members no longer takes place on the edge of a said support plate but on a flat surface portion of the latter.

However, experience shows that under the effects of the specific pressure to which they are subjected, these lateral flanges are subjected to inappropriate flexing, to the detriment of the abutment which they provide for the resilient members.

In order to increase the resistance to flexing of these lateral flanges, this torsion damping device, which is of the kind detailed above and in which one of the guide rings, referred to as a first guide ring and constituting the said support plate, is thinner than the other one which is called the second guide ring, with, for each of the windows of at least the first guide ring, and integral with the latter, various flanges which project from the side opposite to the hub plate, namely an upper flange, a lower flange and two lateral flanges, is in general chlaracterised in that these various flanges are joined integrally and continuously to each other while together defining a rim of an opening which leaves open at least part of the window concerned, and in that the lateral flanges extend at right angles to the general plane of the first guide ring.

Thus the lateral flanges of a window are in effect mechanically attached to the upper and lower flanges of the latter, which, as desired, advantageously increases its resistance to flexing. In addition, the lateral flanges offer a good surface for engagement by the resilient members.

It is of course already known to dispose the resilient members in semicylindrical press-formed seatings in the guide rings.

However, the corresponding upper and lower flanges joined to each other have a lateral thickness in alignment with the resilient members, and this is detrimental to the axial size of the assembly at this level.

No such situation exists in the torsion damping device in this embodiment, the upper flange and the lower flange of a window remaining spaced away from each other on either side of the aperture around the edge of which they extend.

In addition, the first guide ring, which is the thinner one, is stiffened in the region of its windows so that it has the advantage that it is possible to draw from it, in the above mentioned way, resiliently deformable lugs the root zone of which extends between two of these windows, and which subject the assembly to an axial gripping biasing action.

That reduces the number of components necessary for manufacture of the assembly even more, by enabling a resilient ring to be omitted.

Consequently, the second guide ring may in the manner described above, itself have press-formed elements which, being disposed in facing relationshiptwith the said resiliently deformable lugs, can engage frictionally against the hub plate.

Besides stiffening this guide ring, these press-formed elements advantageously also enable a friction ring to be omitted, and therefore enable the number of components necessary to be reduced. Thus the two guide rings do not have the same function. The first guide ring is elastic and the second guide ring is rigid.

Finally, this second guide ring may have in all cases at its inner periphery a frusto-conical engagement surface through which it cooperates with a complementary frusto-conical engagement surface formed for that purpose in the outer periphery of the hub.

That enables the bearing which is usually provided at this level to be omitted.

Preferably, at least part of one of the lateral flanges is part of a press-formed element the base of which projects towards the hub plate.

That enables the first guide ring to be stiffened even further.

The features and advantages of the invention will appear more clearly from the following description, by way of example and with reference to the attached diagrammatic drawings.

In all the Figures, common elements are given the same reference signs.

DETAILED DESCRIPTION OF THE PREFERRED EMBODIMENT

The drawings show by way of example the application of the invention to the case in which the torsion damping device 10 in accordance with the invention constitutes a clutch friction wheel for a motor vehicle.

This torsion damping device comprises at least two coaxial parts 10A, 10B which are mounted for rotation of one with respect to the other within the limits of a predetermined angular displacement, and against the action of axially acting resilient means 11.

In FIGS. 1 to 5, only two coaxial parts 10A, 10B are provided.

One of these coaxial parts 10A, 10B, in this case the coaxial part 10A, comprises firstly a hub 12, which is arranged to be coupled in rotation to a first shaft, in this example a driven shaft, and secondly a hub plate 13 fixed to the hub 12.

The other one of the coaxial parts 10A, 10B, in this case the coaxial part 10B, includes two guide rings 14, 14', which flank the hub plate 13 but are spaced away from the latter. The guide rings 14, 14' are metallic in this case.

This being a clutch friction wheel, in FIGS. 1 to 5 the guide ring 14 constitutes by itself the support plate of a clutch friction wheel 15, and carries at its outer periphery, and on either side, friction liners 16 for coupling it in rotation by friction to a second shaft which in this example is a driving shaft.

The said guide ring 14, which is referred to as the first guide ring, is therefore substantially thinner than the other guide ring 14' which is referred to as the second guide ring.

Figures 1, 2:
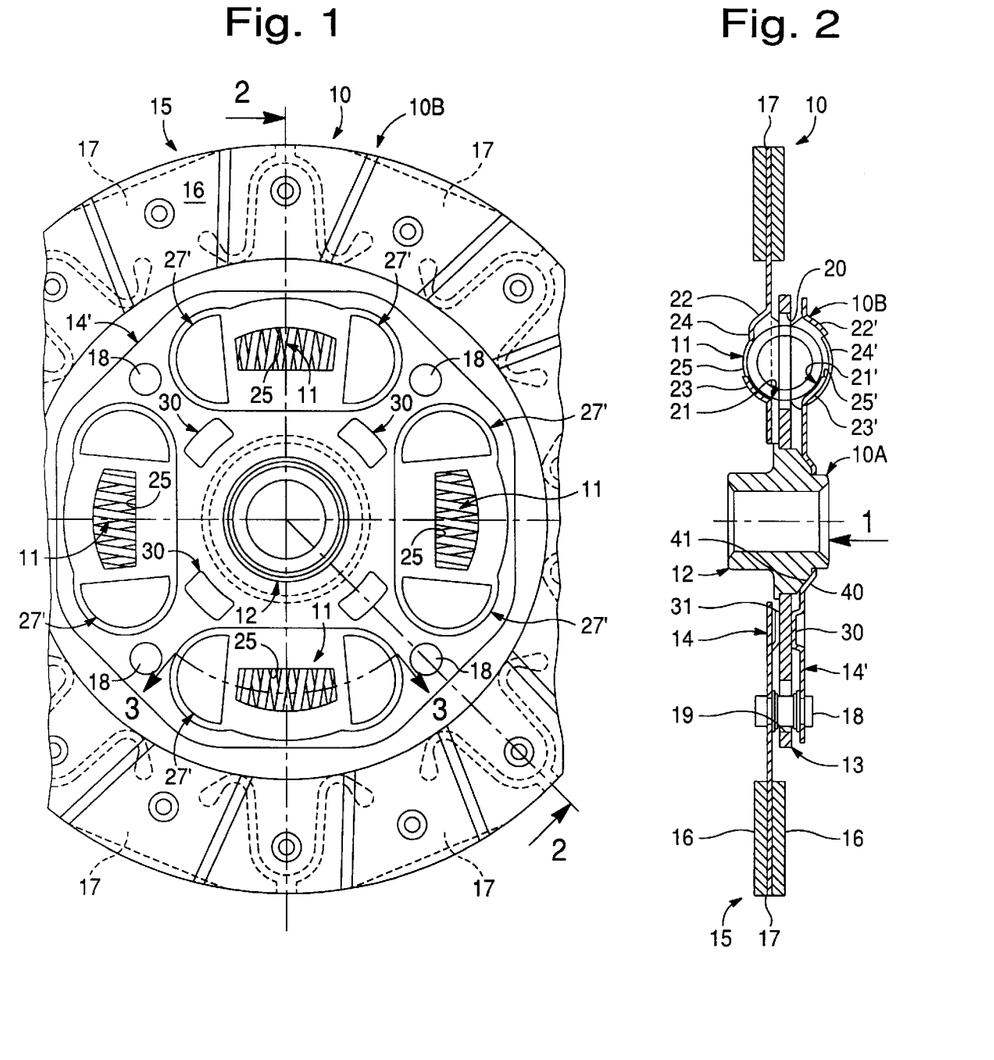
FIG. 1 is a partial view in elevation of a torsion damping device in accordance with the invention, seen in the direction of the arrow 1 in FIG. 2.
FIG. 2 is a view of it in axial cross section taken on the broken line 2—2 in FIG. 1.

In this example the friction liners 16 are fixed by riveting and adhesive bonding to the first guide ring 14, and for their support the latter is divided into blades and tongues 17 at its outer periphery by slots which can be seen in FIG. 1. The first guide ring 14 is treated, in particular heat treated, so as to give the blades the desired elasticity. These blades are axially deformable elastically.

Figure 4:
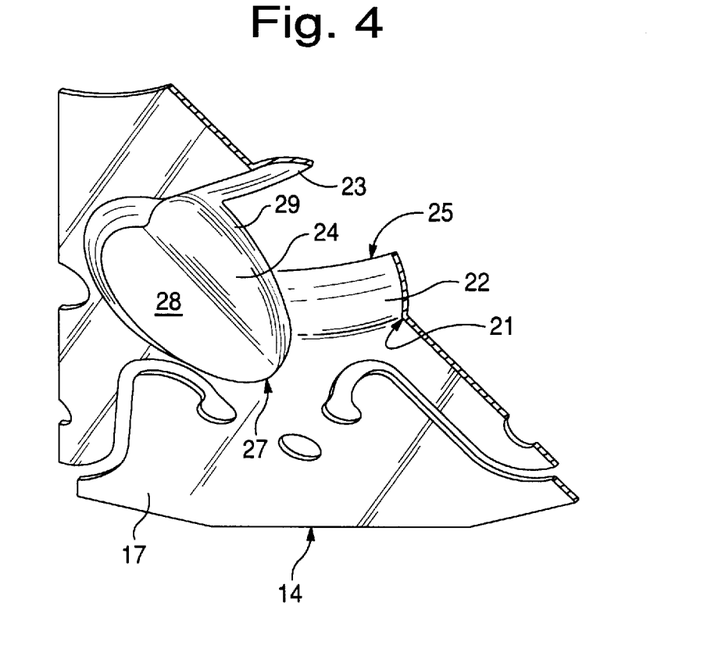
FIG. 4 is a scrap view in perspective, seen in the direction of the arrow 4 in FIG. 3 and showing on an enlarged scale one of the guide rings which form part of the torsion damping device, seen from the same side as its inner surface.
Figure 5:
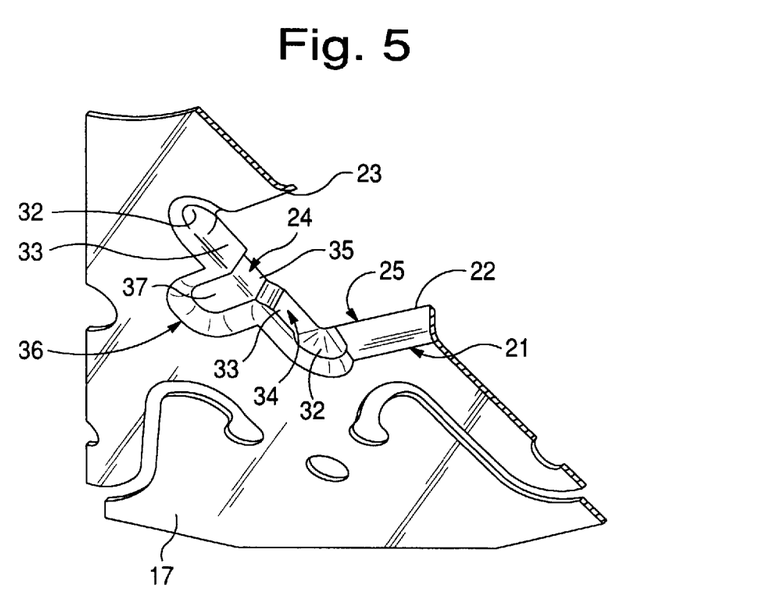
FIG. 5 is a perspective scrap view similar to that in FIG. 4, but showing another version.

In the interests of simplicity, the friction liners 16 have been omitted from FIGS. 4 and 5.

In this example, the guide rings 14, 14' are secured together by means of spacers 18, which are arranged in a circle from place to place and which pass with a clearance through apertures 19 formed for this purpose in the hub plate 13, and which, with the circumferential ends of these apertures 19, define the possible angular displacement between the two coaxial parts 10A, 10B.

In this example the resilient members 11 are helical springs, and they are all disposed substantially tangentially to a common circumference of the assembly.

These resilient members 11 are each partly lodged in windows 20 formed in the hub plate 13, and partly in windows 21, 21' formed correspondingly in the guide rings 14, 14'.

For each of the windows 21, at least in that one of the guide rings 14, 14' that is the thinner, in this example the first guide ring 14, there are provided, integrally with the latter, various flanges which project on the side opposed to the hub plate 13, namely an upper flange 22 which extends along the radially outermost circumferential edge of such a window 21, a lower flange 23 which extends along its radially innermost circumferential edge, and two lateral flanges 24 each of which extends, circumferentially, at its circumferential ends along its two radial edges.

The lateral flanges 24 provide an abutment for the resilient member 11 concerned, one of them in one circumferential direction and the other in the opposite circumferential direction.

According to a feature of the invention, the various flanges 22, 23, 24 are joined integrally and continuously with each other, while together extending as a rim around an aperture 25 which leaves at least a part of the window 21 concerned open.

In FIGS. 1 to 4, at least part of at least one of the lateral flanges 24 is part of a press-formed element 27 the base 28 of which projects towards the hub plate 13. This arrangement enables the height of the lateral edges 24 to be increased.

In this example, both of the lateral flanges 24 are entirely part of such a press-formed element 27, and this element 27, which is blind, has a semicircular plan contour so as to reduce overall size.

In this example the various flanges 22, 23, 24 are all substantially of the same height with respect to the general plane of the guide ring 14.

The upper flange 22 and the lower flange 23 are slightly curved to the profile of the resilient members 11.

The lateral flanges 24, which provide an abutment to these resilient members 11, are by contrast flat, and they extend substantially at right angles to the general plane of the guide ring 14 to give good engagement for the springs 11.

In this example, in order to complete the retention of the resilient members 11, at least one of the lateral flanges 24, and in practice each of the latter, has a return 39 in the form of a crook extending along its free edge. These returns 29 define recesses for the helical springs 11, and reduce the risks of jamming at the ends of the springs In this example, the second guide ring 14' which is the thicker guide ring, has flanges 22', 23', 24' of the same type as those, 22, 23, 24 in the thinner guide ring 14. It also has press-formed elements 27', the base 28' of which projects towards the hub plate 13, and has flat side edges.

In this example elastically deformable lugs 31 formed integrally with the thinner guide ring 14 by stamping and bending or bowing of the latter, bear elastically on the hub plate 11 and thus, in accordance with the invention, apply an axial clamping force to the assembly.

The lugs 31 have an inclined portion which is extended by a transverse portion for contact with the hub plate 13. The inclined portion may have a constant or a variable width, being for example trapezoidal.

Consequently, the second guide ring 14' has, in facing relationship with the resiliently deformable lugs 31, press-formed elements 30 which bear on the hub plate 13.

Local frictional metal to metal contact is thus ensured between the second guide ring 14' and the hub plate 13, so as to damp out oscillations between the two coaxial parts 10A, 10B.

The assembly has the advantage of enabling at least one resilient ring and at least one friction ring to be omitted. The number of components is thus reduced. Storage of the components is simpler. In addition, the risks of errors in the selection of components are reduced.

If desired, the base 28' of the press-formed elements 27' may lie in the plane of that of the press-formed elements 30, in order to reinforce the corresponding friction. In general terms, the guide ring 14' is very robust because of the press-formed elements 27', 28', the press-formed elements 30 being located radially inwardly of the press-formed elements 27'. Two press-formed elements 27' are arranged on either side of one press-formed element 30.

In this example, the root zone of each of the resiliently deformable lugs 31 lies between two windows 21 of the first guide ring 14, and the press-formed elements of the second guide ring 14' themselves lie radially between the windows 21' of that guide ring 14' and the axis of the assembly.

In this example the second guide ring 14' also has at its inner periphery a frusto-conical surface 40 by which it cooperates in a complementary manner with a frusto-conical surface 41 which the hub 12 has at its outer periphery.

This arrangement enables the bearing which is usually provided at this position to be omitted, and therefore enables the number of components necessary for making the assembly to be reduced even more.

In this example the frusto-conical surface 41 of the hub 12 is formed on a thickened portion defining a flange which the latter has at its outer periphery, and it is also on this thickened portion that the hub plate 13 is fixed, in this example by seaming. The second guide ring 14' is very stable due to its frusto-conical surface 40 and its press-formed elements 30.

In FIG. 5 the various flanges 22, 23, 24 are joined together through angle flanges 32 which are generally rounded, and each of which, being of the same height as the foregoing ones, surrounds a local lobe-shaped extension of the window 21 concerned.

In this example at least one of the lateral flanges 24 comprises three flat faces, namely two end faces 33 which are substantially coplanar and which provide an abutment for the resilient member 11 concerned, and a middle face 35 which is behind the plane of the end flat faces 33, being further away than these latter from the opposite lateral flange 24, and which in the manner of a rib, plays a beneficial part in the stiffening of the assembly.

In this example, this middle face 35 is part of a press-formed element 36 which is spaced away from the hub plate 13 so that its base portion 37 is spaced from the latter. The press-formed element projects towards the hub plate 13. The lateral flanges 24 thus extend at right angles to the general plane of the first guide ring. The present invention is of course not limited to the embodiments described and shown, but embraces all practical variations.

In particular, the windows 21, 21' of the two guide rings 14, 14' may have flanges which are not identical, due to the fact that the first guide ring 14 is thinner and therefore easier to deform.

Loose coupling means (FIG. 6) may of course be interposed between the inner periphery of the hub plate and the outer periphery of the hub, as is described for example in the document FR-A-2 270 491.

In that case, the hub plate is movable with respect to the hub within the limits of a sector of angular displacement which is determined by a circumferential clearance between the set of teeth of the hub plate and that of the hub.

Figure 3:
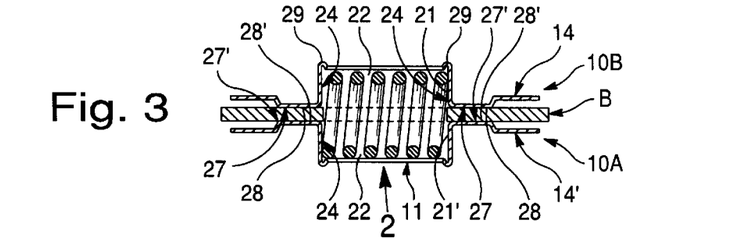
FIG. 3 is a partial view of it in circumferential cross section taken on the line 3—3 in FIG. 1 but in flat projection.

These sets of teeth are interrupted locally, for accommodating resilient members of low stiffness, the hub plate and the hub having for this purpose slots in facing relationship with each other as can be seen in FIGS. 3 and 4 of the document FR-A-2 270 491 mentioned above.

Figure 6:
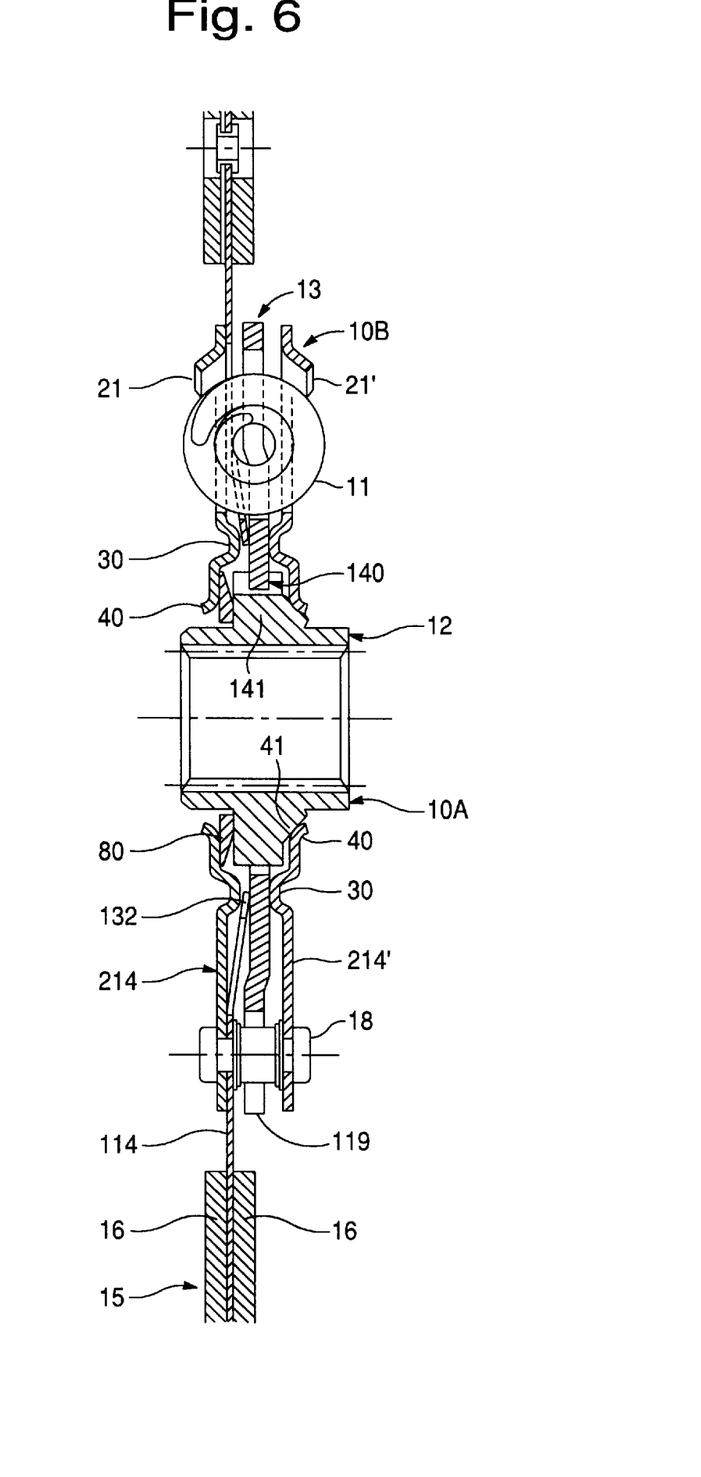
FIG. 6 is a view similar to FIG. 1 for another embodiment.

Thus in FIG. 6, the loose coupling means can be seen at 140, given that the set of teeth of the hub 13 is shorter in the axial direction than the set of teeth in the hub 12.

In that Figure, the spacers 18 extend through the apertures in the form of slots 119 which are open towards the outside and formed in the hub plate 13. These slots 119 replace the closed apertures 19 of FIG. 2.

The spacers 18 serve to secure the support plate 114 of the clutch friction wheel 15 to a third guide ring 214, which is here identical to the second guide ring 214', having at its inner periphery a frusto-conical surface 40 by means of which it cooperates in a complementary manner with a frusto-conical surface 41 formed at the to outer periphery of the hub 12. The second guide ring 214' has press-formed elements 30 radially inwards of its windows 21' in which the resilient members 11 in the form of helical springs are mounted.

The support plate 114, which is thinner than the guide rings 214, 214', has lugs 131 which are resiliently deformable in the axial direction and which are formed integrally at its inner periphery by stamping and bending or bowing.

In this example the lugs 131 are joined at their inner periphery to an annular ring 132 which thus bears elastically against the hub plate 13. The lugs 131 therefore bear indirectly on the hub plate 13 and therefore subject the assembly to an axial clamping force. As in FIGS. 1 to 4, the resilient lugs 131 urge the press-formed elements 30 into contact with the hub plate 13.

In FIG. 6 the support plate 114 is distinct from the third guide ring 214, to which it is attached at its outer periphery.

More precisely, the plate 114 is in contact at the level of the spacers 18 with the inner face of the third guide ring 214 that faces towards the hub plate 13. The spacers 18 therefore secure the plate to the rings 214, 214'.

This plate 114 has a central portion (FIGS. 7 and 8) which is resilient and bowed.

Figure 7:
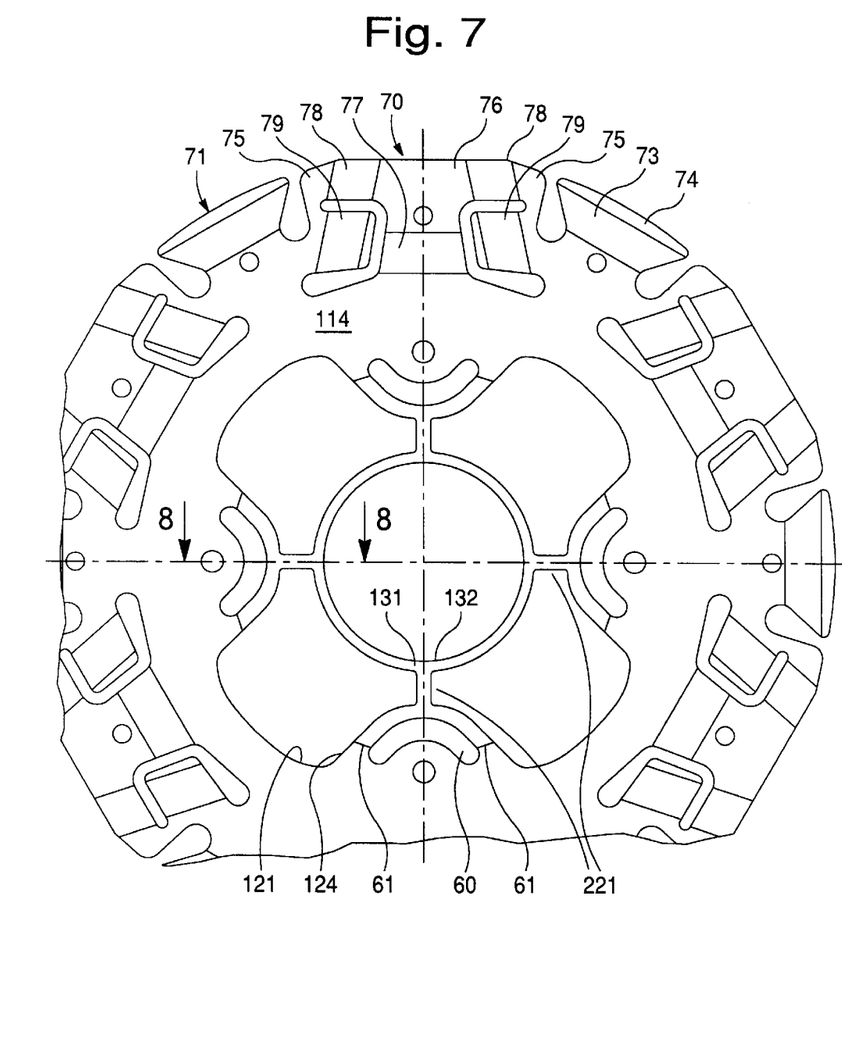
FIG. 7 is a front view showing part of the support plate in FIG. 6.
Figure 8:
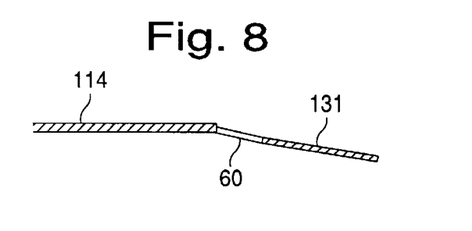
FIG. 8 is a view of the support plate in cross section taken on the line 8—8 in FIG. 7.

This central portion includes the lugs 131, the ring portion 132 and a part of the windows 121 which the plate 114 has so that the springs 11 can pass through them with a clearance. These windows 121 do not have flanges and do not serve for mounting the springs 11.

Each lug 131 is bounded on the outside firstly by an aperture 60 in the form of a crescent lying inwardly of a hole 61 for passage of a spacer 18, and secondly by the bend line 62 of the central part of the support. This line 62 consists of two portions on either side of one aperture 60.

These portions extend from the aperture 60 to the lateral edge 124 of a window 121 which is bounded on the inner side by the ring portion 132.

The lugs 131 extend radially between two consecutive windows 121 and are bounded laterally by these consecutive windows. On the inside, the lugs 131 are joined to the ring portion 132. It will be noted that the radially innermost corners 221 of the windows have been widened in the circumferential direction, so that the lugs have the form of a thin radial strip of material between the corners 221, and are expanded radially beyond the corners so as to define two curved portions matching the form of the aperture 60.

As will have been understood, various cut-outs 60, 121, 221 and a bow (or bend) are formed in the support plate 114.

The stiffness of the axially resilient lugs 131 may be modified by modifying the form of the cut-outs, and especially the form of the apertures 60 and the corners 221, and/or the angle of bending. Thus the corners 221 can be omitted.

The same is true in the embodiment of FIGS. 1 to 5.

In general terms, because of the bending, the inner periphery of the lugs 31, 131 is offset axially with respect to the outer periphery of the said lugs and the windows 121 are inclined at their inner periphery.

The support plate 114 includes a peripheral portion which comprises blades 70 of the tripod type. These blades 70 are arranged alternately in the circumferential sense with a set of radial tongues 71 in the manner described in the document FR-A-2 702 811.

For more detail, reference should be made to that document or to US-A-5,452,783 corresponding with it, which also shows the loose coupling means and the resilient members of low thickness which are interposed between the hub plate 13 and the hub 12.

Thus the blades 70 have, by virtue of bends 77, 78, a central engagement zone 76 and two peripheral engagement zones 75 on either side of the central engagement zone.

The tongues 71 have at their free end a supplementary engagement zone 74 defined by a junction bend 73 which is tangential, that is to say it lies at right angles to the radial axis of symmetry of the tongue 71.

In accordance with one feature, the peripheral zones 75 are joined to the inner portion of the tongue 71, that is to say each one is joined to the portion of the tongue 71 which lies radially inwardly of the bend 73 and in the plane of the plate 114. In this way the engagement surfaces offered by the plate 114 to the friction liners 16 which are here secured by riveting respectively to the tongues 71 and to the blades 73 is further increased. In another version, fastening is obtained by adhesive bonding. The blades are more solid and less sensitive to centrifugal force.

The zone 74 is offset axially towards the central engagement zone 76 of a blade 70, which is itself offset axially by virtue of a junction bend 77 which is tangential with respect to the tongue 71.

Oblique junction bends 78 separate the zones 75 from the zones 76. The bends 78 are inclined with respect to the radial axis of symmetry of a blade at right angles to the bend 77. Lugs 79 are disposed on either side of the bend 77.

The lugs 79 are defined by the bends 78, and have a root zone in the plane of a peripheral zone 75, in this example in the plane of the tongues 71 and support plate 114. The ends of the lugs 79 are in the plane of the central zones 76.

It will be noted that an axially acting resilient ring 78 is interposed axially between the-hub 12 and the inner periphery of the guide ring 214. The ring 80 biases the frusto-conical portion 40 of the guide ring 214' axially into contact with the frusto-conical engagement surface 41 of the hub 12.

The ring 80 exerts a weaker axial force than the tongues 131 and is coupled in rotation, for example by means of pins, not shown, to the third guide ring 214.

As is known, in a first phase of the relative angular displacement between the guide rings 214, 214' and the hub 12, the resilient members of low stiffness interposed between the hub plate 13 and the hub 12 are compressed because the springs 11 are stiffer. No relative movement occurs therefore between the hub plate 13 and the guide rings 214, 214'.

In this first phase, a relative movement occurs between the engagement surfaces 40, 41 under the biasing effect of the ring 80.

After the clearance has been taken up between the teeth of the hub plate 13 and the hug 12, the low stiffness resilient members remain compressed and a relative movement occurs between the hub plate 13 and the guide rings 214, 214', the plate 11 remaining fixed in rotation with respect to the hub 12.

The press-formed elements 30 and the annular ring portion 132 rub against the hub plate 30 frictionally under the biasing effect of the lugs 131.

It will be noted that the ring 80 is of tapered form at its outer periphery and has a large surface area in contact with the lateral face of the flange 141 which is formed on the hub 12 at its outer periphery. It is on the outer periphery of this flange that the external set of teeth of the hub 12 is formed. The other face of the flange is defined by the surface 41.

The guide rings 214, 214', which are press-formed, are therefore wider at their inner periphery bounded radially on the outside by the press-formed elements 30 and radially on the inside by the frusto-conical surface 40. The press-formed elements 30 may be joined to each other so as to constitute an annular ring which centres the resilient ring 80, which in this example is of mouldable plastics material and is wider at its inner periphery. The ring 80 is bowed and is therefore inclined axially.

The clutch friction wheel therefore comprises in all cases a minimum number of components with metal-to-metal frictional contacts.

Figure 9:
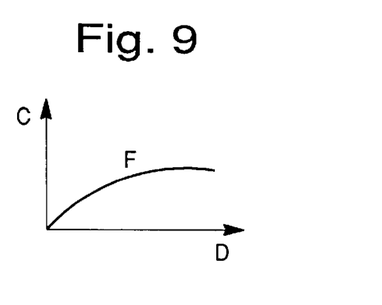
FIG. 9 shows the characteristic curve of the support plate of FIG. 7.

The annular ring portion 132 is in facing relationship with the press-formed elements 30. It can be seen that the characteristic curve F of the tongues 131 (FIG. 9) is particularly advantageous. This curve represents the load (or force) C which is exerted by the lugs 131 as a function of their displacement or deflection D. Thus, once fitted, the tongues exert a substantially constant load on the hub plate 13, which enables manufacturing tolerances to be taken up.

The guide rings 214, 214' may of course have only two flanges, which extend along their innermost and outermost radial edges. This is the case in FIG. 6.

Similarly, the support plat 114 may be fixed directly on an engine flywheel for driving it in rotation.

Metal-to-metal contacts may be avoided by interposing a ring or coatings between the metallic surfaces.

The press-formed elements 30 may be joined together continuously. Preferably, the press-formed elements 30 are separated from each other by a narrow gap so as to enable lubricating oil to be evacuated while the press-formed elements are being made in the press.

The windows of the hub plate 13 may be replaced by outwardly open notches. The springs 11 are thus mounted in seatings 20 in the hub plate 13, which are here in the form of apertures.

Thanks to the invention the hub plate 13 is unchanged and is of constant thickness.

The different embodiments may be combined.

Thus in FIG. 6, the hub plate 13 may be fixed to the hub 12, the ring 80 being omitted.

In FIG. 1 the guide ring 14' may be replaced by the guide ring 214', and vice versa.

The lugs 131 in FIG. 6 may be replaced by the lugs 31 of FIG. 1 and vice versa. By giving the windows 121 and the corners 221 flanges, the ring 214 may be omitted.

What is claimed is:

1. A torsion damping device comprising at least two coaxial parts (10A, 10B) mounted for rotation of one with respect to the other within the limits of a predetermined angular displacement and against the action of circumferentially acting resilient members (11), one of the coaxial parts (11 A, 11B) comprising a hub plate (13) while the other comprises a support plate (14, 114) fixed to two guide rings (14, 14') which flank and are spaced away from the hub plate (13), and each of the resilient members (11) being mounted partly in seatings (20) formed in the hub plate (13) and partly in corresponding seatings (21, 21') formed in the guide rings (14, 14'), whereby a first one of the guide rings (14', 214'), includes press-formed elements and which are directed towards the hub plate (13), and in that the support plate (14, 114) is firstly arranged on the other side of the hub plate (13) with respect to the first guide ring (14, 214'), and secondly has, in facing relationship with the press-formed elements (30), lugs (31, 131) which are elastically deformable in the axial direction and which act on the hub plate (13) so as to urge the press-formed elements (30) towards the hub plate (30).

2. A torsion damping device according to claim 1, wherein the lugs (31, 131) of the support plate (14, 114) are of bent form.

3. A torsion damping device according to claim 2, wherein the lugs (131) are fixed at their inner periphery to an annular ring portion (132).

4. A torsion damping device according to claim 3, wherein the lugs (131) are bounded radially by an opening (60) and by a bend line (61).

5. A torsion damping device according to claim 4, wherein the support plate (114) has windows (121) for the resilient members (11), and in that the radially innermost corners (221) of the windows (121) are widened in the circumferential direction so that the lugs (131) are bounded laterally by the windows (121) and the corners (221).

6. A torsion damping device according to claim 2, wherein the support plate (114) is attached at its outer periphery to a second one of the guide ring (214).

7. A torsion damping device according to claim 2, in which the seatings in the guide rings (14, 14') consist of windows, and in which the other ring (14), referred to as a first guide ring and thinner than the second guide ring, consists of the support plate with, for each of the windows (21) in the first guide ring (14) which is the thinner of the two, and integral with the latter, various flanges (22, 23, 24) which project from the side opposite to the hub plate (13), namely an upper flange (22) which extends along the radially outermost circumferential edge of a said window (21), a lower flange (23) which extends along its radially innermost circumferential edge, and two lateral flanges (24) each of which extends respectively along its two radial edges, wherein these various flanges (22, 23, 24) are joined integrally and continuously to each other while together defining a rim of an opening (25) which leaves open at least part of the window (21) concerned, and in that the lateral flanges (24) extend at right angles to the general plane of the first guide ring (14').

8. A torsion damping device according to claim 7, wherein at least part of at least one of the lateral flanges (24) is part of a press-formed element (27) the base (28) of which projects towards the hub plate (13).

9. A torsion damping device according to claim 8, wherein the various flanges (22, 23, 24) are joined to each other through angle flanges (32), which are generally rounded and each of which surrounds a lobe-shaped local enlargement of the window (21) concerned.

10. A torsion damping device according to claim 5, wherein at least one of the lateral flanges (24) has three flat faces (33, 35), namely two end faces (33) which are substantially coplanar and a middle face (35) which is set back with respect to the end faces (33), being further away than these latter from the opposed lateral flange (24).

11. A torsion damping device according to claim 9, wherein at least one of the lateral flanges (24) has a return (29) in the form of a crook along its free edge.

12. A torsion damping device according to claim 8, characterised in that the various flanges (22, 23, 24) are all of substantially the same height.

13. A torsion damping device according to claim 7, characterised in that, along the edges of each of its windows (21'), the thicker guide ring (14'), namely the second guide ring (14'), has flanges (22', 23', 24') of the same type as those (22, 23, 24) of the thinner first guide ring (14).

14. A torsion damping device according to claim 8, characterised in that resiliently deformable lugs (31), formed integrally with the first guide ring (14), bear elastically on the hub plate (13).

15. A torsion damping device according to claim 14, characterised in that, in facing relationship with the resiliently deformable lugs (31), the second guide ring (14') has press-formed elements (30) which bear on the hub plate (13).

16. A torsion damping device according to claim 1, characterised in that the second guide ring (14, 114) has at its inner periphery a frusto-conical engagement surface (40) by means of which it cooperates with a complementary frusto-conical engagement surface (41) disposed on the hub.

* * * * *